United States Patent [19]
Hsieh et al.

[11] Patent Number: 5,969,750
[45] Date of Patent: *Oct. 19, 1999

[54] MOVING PICTURE CAMERA WITH UNIVERSAL SERIAL BUS INTERFACE

[75] Inventors: Peter H. Hsieh, Sunnyvale, Calif.; Shyh-Rong Wang, Hsinchu, Taiwan

[73] Assignee: Winbcnd Electronics Corporation, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,388

[22] Filed: Sep. 4, 1996

[51] Int. Cl.⁶ .................................................. H04M 11/00
[52] U.S. Cl. .............................. 348/15; 348/17; 348/387; 348/390
[58] Field of Search ....................... 348/14–20, 384–387, 348/388, 390

[56] References Cited

U.S. PATENT DOCUMENTS

| | | | |
|---|---|---|---|
| 5,253,059 | 10/1993 | Ansari et al. | 348/390 |
| 5,347,305 | 9/1994 | Bush et al. | 348/17 |
| 5,351,084 | 9/1994 | Blair | 348/390 |
| 5,381,412 | 1/1995 | Otani | 348/14 |
| 5,392,284 | 2/1995 | Sugiyama | 348/14 |
| 5,485,504 | 1/1996 | Ohnsorge | 348/14 |
| 5,491,507 | 2/1996 | Umezawa et al. | 348/14 |
| 5,491,513 | 2/1996 | Wickstrom et al. | 348/390 |
| 5,541,852 | 7/1996 | Eyuboglu et al. | 370/60 |
| 5,548,322 | 8/1996 | Zhou | 348/14 |
| 5,550,580 | 8/1996 | Zhou | 348/15 |
| 5,550,590 | 8/1996 | Sakazawa et al. | 348/387 |
| 5,557,663 | 9/1996 | Huang et al. | 348/14 |
| 5,563,649 | 10/1996 | Gould et al. | 348/17 |
| 5,563,884 | 10/1996 | Fimoff et al. | 348/387 |
| 5,629,736 | 5/1997 | Haskell et al. | 348/387 |
| 5,687,095 | 11/1997 | Haskell et al. | 348/378 |

*Primary Examiner*—Vivian Chang
*Assistant Examiner*—Xu Mei
*Attorney, Agent, or Firm*—Proskauer Rose LLP

[57] ABSTRACT

A camera is provided that can be connected to a processing system via an external connector outside of the housing of the processing system. The camera includes a camera housing. An imaging device is provided inside the camera housing that converts moving pictures to a video signal. A bit rate reduction circuit is also provided inside the camera housing and connected to the imaging device. The bit-rate reduction circuit reduces a bit rate of the moving picture signal so as to produce a bit-rate reduced video signal having a lower bandwidth than the video signal prior to bit rate reduction.

12 Claims, 4 Drawing Sheets

MOVING PICTURE CAMERA WITH UNIVERSAL SERIAL BUS INTERFACE

FIELD OF THE INVENTION

The present invention relates to video. In particular, the present invention pertains to "plug and play" cameras that can be connected to, for example, a personal computer via a standard bus.

BACKGROUND OF THE INVENTION

FIG. 1 depicts a conventional video conferencing system 10. A camera 12 of the video conferencing system 10 has a charge-coupled device or CCD 13 on which an image is incident. Cameras of the type illustrated in FIG. 1 called ColorCam are available from Connectix™ a company located in Mountain View, Calif. The CCD 13 outputs a still or moving picture video signal representing the image or images incident thereon to an analog to digital converter (ADC) 15. The ADC 15 illustratively outputs an RGB format digital video signal. The digital video signal is conveyed by a cable 16 to a parallel printer port 18 of a computer system 20. The picture data received from the parallel printer port 18 is provided to a frame capture I/O expansion card 19 via a proprietary internal cable 23. The I/O expansion card 19 has a buffer for receiving frames of the digital video signals for communication via I/O expansion bus 22 to an I/O bridge 24. The I/O bridge 24 retransmits the video data thus received via a system bus 26 to a processor 28. Once at the processor 28, the bit rate of the video signal may be adjusted in a number of ways. For instance, the resolution or frame rate may be decreased. Alternatively, the video may be encoded according to one of a number of encoding standards including ITU's (International Telecommunications Union) H.261, H.262, or H.263, ISO/IEC's MPEG-1, MPEG-2, JPEG, or motion JPEG, etc. After reducing the bit rate of the video signal sufficiently, the bit rate reduced video signal may be outputted from the processor 28, via system bus 26, I/O bridge 24 and I/O expansion bus 22 to a modem 30. The modem 30 transmits the bit reduced video signal to a remote video conferencing system 10' via a network 32, such as a public telephone network, local area network (LAN), metropolitan area network (MAN), wide area network (WAN), etc. The bit rate reduced video signal is received at a like modem 30 and communicated to a like processor 28 where it is restored (decompressed, spatially and/or temporally interpolated, etc). The restored video signal is then outputted to a graphics adapter 33 and displayed on a display monitor 34. Alternatively, the restoration can be performed on the graphics adapter 33 using specialized hardware.

A conventional personal computer system 20 generally only has two standard ports, namely, a parallel port and a serial port. The parallel port is typically used for outputting data to a printer and can output data at a maximum 100 Kbyte/sec burst transfer rate using a handshake protocol. The serial port, on the other hand, is typically connected to an input device, such as a mouse, or a modem and can typically only sustain a 115.2 Kbit/sec transfer rate (e.g., using a 16550 UART). As noted above, the camera 12 can connect to a standardized connector at the printer port 18. This enables the camera 12 to be used with different platforms (e.g., different computer systems). However, to do so, the printer must be disconnected from the parallel port 18 as the parallel port 18 can only support data transfers between the computer system 20 and one other peripheral device (pursuant to its handshake protocol). This is disadvantageous. Another disadvantage of the computer system 20 is that the computer system housing (represented by 21) must be opened to install the frame capture I/O expansion card 19 and to manually connected the proprietary connector 23 between the parallel port 18 and the frame capture I/O expansion card 19. Thus, a novice user may find it difficult to install and to configure the camera 12. Moreover, for many systems 20, the warranty on the computer is voided if the computer housing 21 is opened by the user.

The camera 12 is well suited for non-real-time still picture capture. In capturing a still image, there is no requirement to transfer the data of the still picture from the camera 12 to the computer system 20 (or to, for example, another video conferencing system 10') in real time. A raw RGB signal for a 600×800 pixel display screen contains (800×600 pixels)·24 bits/pixel=11,520,000 bits. At the maximum 100 Kbyte/sec burst transfer rate of the parallel port 18, the transfer of one still image from the camera 12 to the computer system 20 takes over 14 seconds (without adding in the overhead of the printer port 18 handshake protocol or any other bus arbitration of transfer latency of the computer system 20). Moreover, to transfer such information via modem 30 connected to an ordinary telephone network (which can have up to a 28.8 Kbit/sec transfer rate) would require 400 sec. This presents a problem for real time video communication, such as, video conferencing, in which moving pictures must be captured, transferred, and displayed in real time.

It is possible to program processor 128 to perform a limited amount of real time video capture for transfer via the network 32 using the video conferencing system 10. The problem is that only a limited amount of data can be transferred from the camera 12 via the printer port 18 to the frame capture I/O expansion card 19 due to the limited bandwidth of the printer port 18. As such, the resolution of the image must be drastically reduced to no larger than 128×96 pixels (for a black and white image) which results in approximately a 2"×2" picture on a normal display monitor 34. The frame rate is reduced to approximately 7 frames per second (using a frame dropping technique). (Note that (128×96)·(8 bits/pixel)·(7 frames/second)=688,128 bits/sec which is slightly less than the 100 kbyte sec maximum bust transfer rate of the parallel port 18.) Moreover, the image quality is severely deteriorated; ghost shadows are perceptibly present in the restored image, and the image breaks up whenever there is a large degree of motion in the picture.

FIG. 2 shows a modified video conferencing system 50. In this system 50, the camera 12 produces either an analog signal or a digital RGB signal carried by cable 16. The signal is received at a video processing I/O expansion card 52 that is inserted into an available slot 54 on the I/O expansion bus 22. The I/O expansion card 52 can have a frame capture circuit 55, an ADC 56 and a bit rate reduction circuit 58 (e.g., a video compressor or frame rate/resolution reduction circuit). Examples of such circuits include the Vision Controller Processor (VCP™) available from 8×8™, a company located in Santa Clara, Calif., and APV-3™ available from Lucent™, a company located in Murray Hill, N.J. The video signal is received at the video bit rate reduction circuit 58 on the video card 52 and is bit rate reduced thereat. The bit rate reduced video signal is then transmitted on the I/O expansion bus 22 to the processor 28 and/or to the modem 30.

The video conferencing system 50 can provide an adequate frame rate and resolution video signal at a bit rate which can be transmitted via the modem 30. The problem with the system 50 is that the computer housing 60 must still be opened to install the video processing I/O expansion card 52. Second, the cable 16 connects to a non-standardized connector 62 on the video processing I/O expansion card 52. This reduces the interchange-ability of video cameras 12 from platform to platform.

FIG. 3 shows an IEEE 1394 compliant camcorder 90 soon to be available from Sony™ a company located in Tokyo, Japan. The IEEE 1394 standard is a new standard for compression, storage and transfer of consumer and professional use digital video signals. The camcorder 90 includes a CCD 91, an ADC 92, a motion JPEG compressor 93 and an IEEE 1394 interface 94. A video signal outputted from the CCD 91 is converted to digital form in ADC 92 and then compressed in JPEG compressor 93. The compressed video signal is then formatted according to the IEEE 1394 standard and outputted to a bus using interface 94. The IEEE 1394 bus is a 400 Mbit/sec bus for which no computer interface is yet available. Moreover, the IEEE 1394 bus is designed for transfer of video signals only--no specific provisions are provided for supporting non-video "bursty" data transfers.

Another problem specific to both the video conferencing system 10 and video conferencing system 50 pertains to properly setting up the system on each end of the communication. For instance, there is no guarantee that both the video conferencing system 10 and the video conferencing system 10' will use the same camera, the same frame captured board or technique, or have the same coding/decoding capabilities. Even when both video conferencing systems on each end of the communication are identical, a skilled operator is necessary to properly install the hardware and software and also to configure the software and hardware each session. In particular, the operator must select the correct software drivers, select compatible bit rate reduction methodologies, i.e., the correct encoding and decoding technique, options and parameters, the correct resolution, the correct frame rate, etc. In the case where each end of the communication need not have an identical video conferencing system 10 or 10' each operator must be provided with preliminary information on the capabilities of the system at the other end and must somehow agree to select the correct frame rate, resolution, encoding/decoding technique parameters and options. This makes it difficult for a novice user to establish an interactive video teleconference with an arbitrary user.

It is object of the present invention to overcome the disadvantages of the conventional cameras. In particular, it is object to provide a video conferencing system in which the camera can be connected to a standard computer port without opening the computer housing, yet have sufficient resolution and fidelity to enable interactive communication of moving pictures. It is also an object to provide other kinds of video peripherals which can output and receive video signals in a simple "plug and play" fashion. It is furthermore an object to provide a video conferencing system that can arbitrate with a like far end video conferencing system and automatically configure itself on a session by session basis.

SUMMARY OF THE INVENTION

These and other objects are achieved by the present invention. An illustrative environment of use of the present invention is a video conferencing system including a first housing. A bus is contained in the first housing. A processor contained in the first housing is connected to the bus. A first interface is also contained in the first housing and connected to the bus. The first interface has a serial port that is accessible externally to the computer housing and to which a connection can be made externally with a standard connector.

According to one embodiment, a camera is provided that can be interconnected to the first interface, e.g., via a communications medium. The camera includes a camera housing. An imaging device, such as a CCD, tube, or CMOS photosensor, is provided inside the camera housing that converts moving pictures to a video signal. A bit-rate reduction circuit is also provided inside the camera housing and connected to the imaging device. The bit-rate reduction circuit reduces a bit rate of the moving picture signal so as to produce a bit-rate reduced video signal having a lower bandwidth than the video signal prior to bit rate reduction.

Illustratively, a second interface is provided inside the camera housing and connected to the bit-rate reduction circuit. The second interface circuit communicates the bit-rate reduced video signal outside of the camera housing as a serial bitstream to the first interface via the communications medium. Illustratively, both the first and second interfaces are bidirectional. The first interface can download instructions to the bit rate reduction circuit via the second interface. Such instructions can include instructions for varying the bit-rate reduction by the bit-rate reduction circuit, e.g., resolutions and frame rates, compression technique or various compression parameters.

According to another illustrative embodiment, the camera contains at least one register or memory which contains information on the bit rate varying capabilities of the camera. Such information can be downloaded via the interfaces and communications medium to the processor in the first housing. The processor in the first housing may execute suitable software according to which the processor determines the picture resolution, frame rate, compression, etc. capabilities of its attached camera. The processor then may communicate with a like far end video conferencing system which also possesses information about the capabilities of its attached camera. Over the course of the communication, the two video conferencing systems negotiate acceptable bit rate reduction techniques (i.e., a compatible resolution, frame rate, compression technique, compression parameters, compression options, etc). In particular, the far end video conferencing system transfers to the processor information regarding moving picture restoration capabilities at the far end. As a result of these negotiations, the processor downloads appropriate instructions to the second interface for varying the bit rate reduction so as to produce a bit rate reduced video signal that can be restored by the far end video conferencing system.

By reducing the bit rate of the video signal prior to transfer to the first housing, it is possible to input the video signal via a serial port and connector already provided on the computer for lower bandwidth data transfers. Thus, it is not necessary to open the first housing to install an interface card for receiving the video signal. On the other hand, the bandwidth of the video signal can be reduced in a controllable fashion, e.g., by resolution reduction, compression, or a combination thereof, to maintain acceptable fidelity.

DETAILED DESCRIPTION OF THE INVENTION

According to the present invention, the bandwidth of the video signal produced by the camera is reduced so that the video signal can be inputted to an existing serial port of a computer system. The existing serial port has a connector that is external to the computer system and therefore the user need not open the computer system housing to install the camera. Thus, installation of the camera is simplified. Moreover, many manufacturers provide that the warranty on the computer is voided if the user opens the computer housing. As such, the invention also allows the user to circumvent a potential voiding of the computer system warranty.

Figure 4:
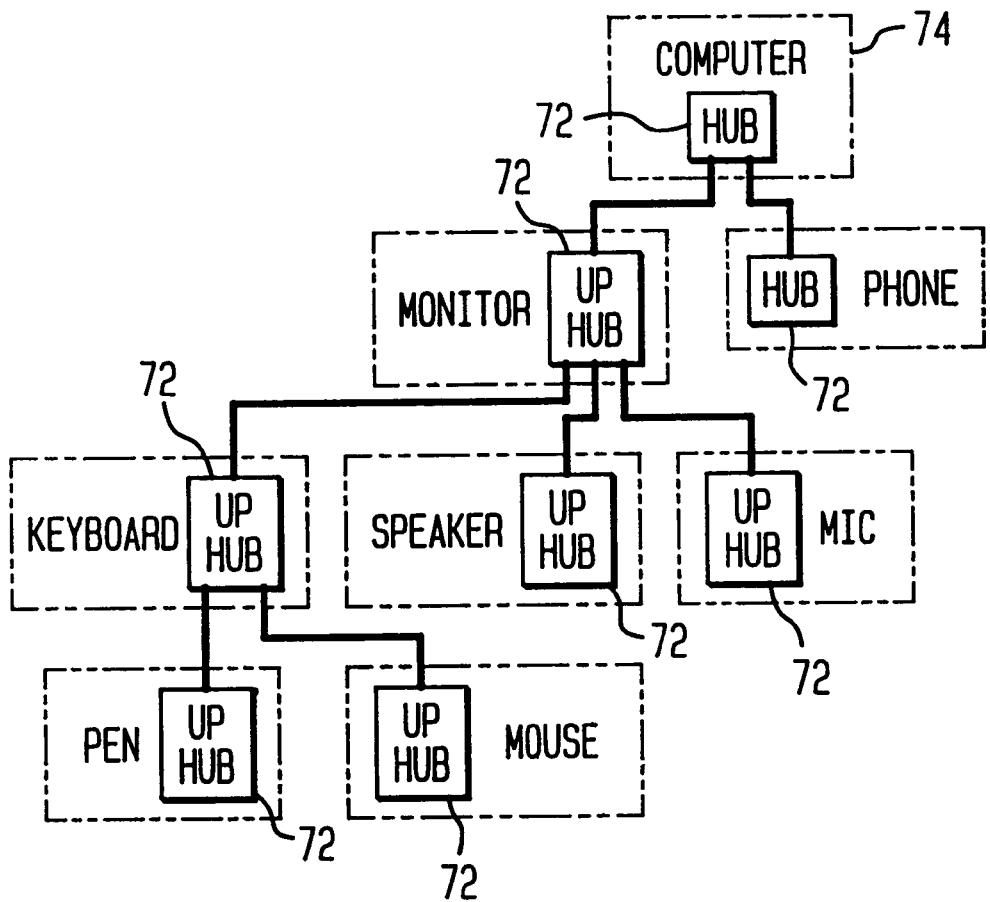
FIG. 4 shows a conventional Universal Serial Bus architecture.

In an illustrative environment of use, a camera is connected to a Universal Serial Bus (USB) interface. See Open HCI, Universal Serial Bus Specification v.1.0, Jan. 19, 1996. USB is a bus and interface standard recently adopted by both computer system manufacturers and peripheral equipment manufacturers. USB is a packet switch medium, such that it can support, e.g., instruction and video packets having address information. FIG. 4 shows a computer system with peripherals, such as a display monitor, keyboard, mouse, loudspeaker, microphone, telephone, etc., connected according to the USB architecture. Each peripheral illustratively has a hub circuit 72 with one upstream port and one or more downstream ports. The upstream direction is towards the computer system 74. The downstream direction is away from the computer system 74. Peripherals can be connected in any arbitrary tree topology with the computer system 74 at the root.

Communication on the USB is via a serial bitstream in either an isochronous or asynchronous fashion. Each hub therefore contains both transmit and receive circuitry. Communication can be achieved at a predefined "slow" rate of about 1.2 Mbits/sec or a full rate of up to 12 Mbits/sec.

The USB standard, in addition to specifying a protocol for communication on the serial bus, also specifies a standard connector. The manufacturers which have adopted the USB standard will deliver future computers and peripherals with such standard connectors located externally to the housing of the computer systems and peripherals. Thus, all monitors, keyboards, microphones, etc, will be easily connected using standard cabling. Furthermore, USB provides a protocol for the computer 74 to recognize each device connected thereto. This simplifies installation of hardware components. Devices possessing such installation simplifications, i.e., simple connection and auto-recognition and configuration, are frequently said to be "plug and play."

Figure 5:
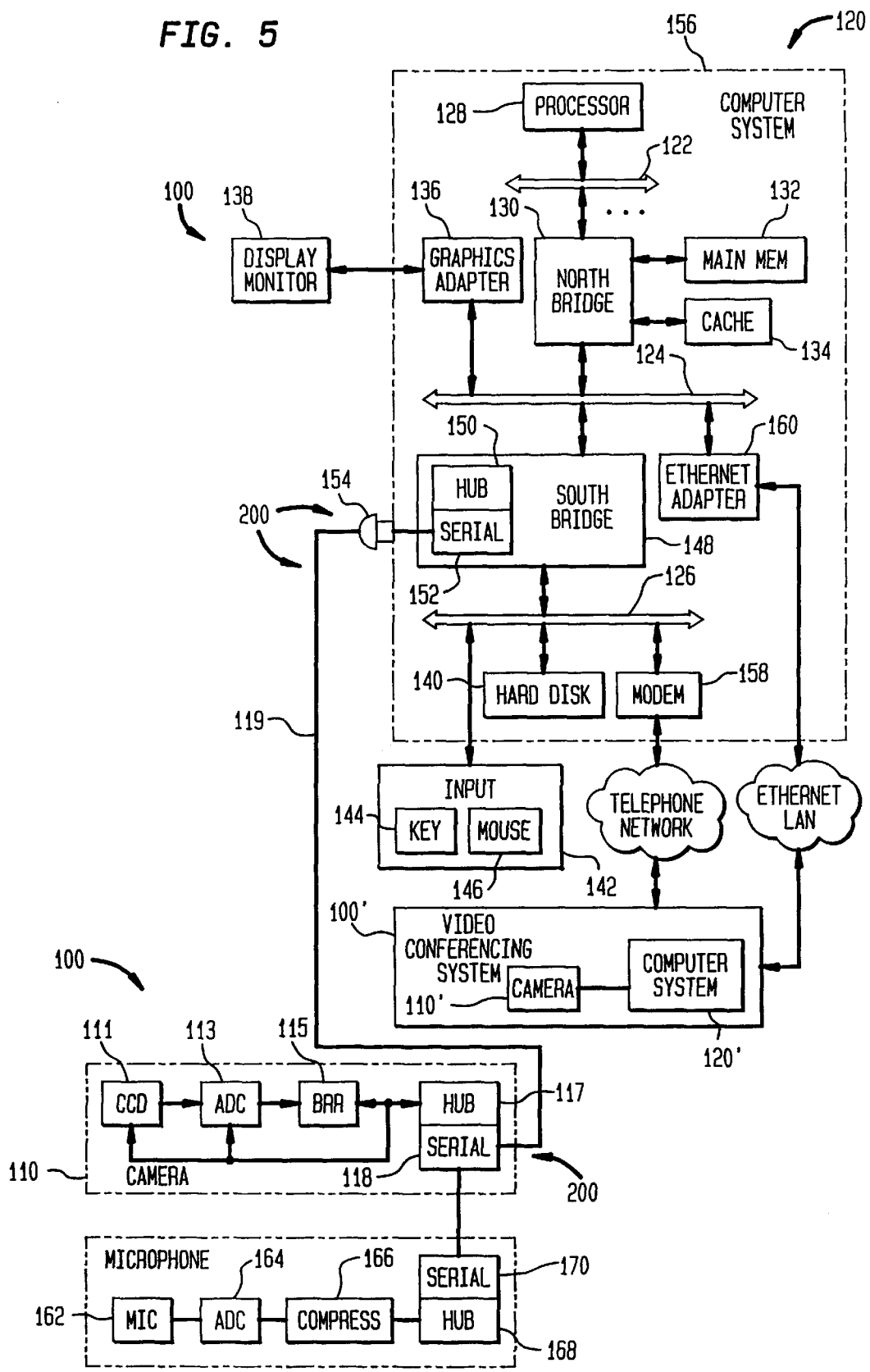
FIG. 5 shows a video conferencing system according to an embodiment of the present invention.

FIG. 5 illustrates a video conferencing system 100 according to an embodiment of the present invention. As shown, a camera 110 is connected to a computer system 120 externally to the housing 156 of the computer system 120. The computer system 120 illustratively includes a cpu bus 122, a system bus 124 (e.g., a PCI bus) and an I/O expansion bus 126 (e.g., as ISA bus). Connected to the cpu bus 122 is at least one processor 128 and a "north" bridge or memory controller 130. The north bridge 130 connects a cache 132 and a main memory 134 to the processors 128 on the cpu bus 122. The north bridge 130 also enables data transfers between devices on the system bus 124 and the memories 132 and 134 or the processors 128. Also connected to the system bus 124 is a graphics adapter 136. A display monitor 138 may be connected to the graphics adapter 136. As shown, an Ethernet adapter 160 may be connected to the system bus 124.

Connected to the I/O expansion bus 140 is a disk memory 140 and interface, such as an IDE interface, a modem 158, and input devices 142 such as keyboard 144 and mouse 146. (Alternatively, the keyboard 144 and mouse 146 may also be connected to the USB hub 150.) Also connected between the system bus 124 and the I/O expansion bus 126 is a south bridge 148 or I/O bridge. The south bridge 148 enables data transfers between devices on the I/O expansion bus 126, such as modem 158, and devices on the USB 200 or devices on the system bus 124. Illustratively, according to the invention, the south bridge 148 also includes a USB hub 150. The USB hub 150 has one or more serial ports 152 that are connected to standard USB compliant connectors 154 to which a connection may be made totally externally to the housing 156 of the computer system. Illustratively, the USB hubs 150, 117, 168 and cables 119 form the USB bus 200.

Note that the south bridge 148 contains buffers for decoupling transfers amongst the system bus 124, I/O expansion bus 126 and hub 150. No "capture" or extra buffering capability is necessary to enable full rate data transfers on the USB 200 to the hub 150.

The camera 110 is shown as including an imaging device, such as a tube, CMOS photo sensor or CCD 111, on which video images are incident. The imaging device 111 converts the image to a motion picture video signal representative thereof. The video signal is converted to digital form in ADC 113. The digital signal outputted from ADC 113 is received at a bit rate reduction circuit 115. The bit-rate reduction circuit 115 may be a programmable frame rate/resolution reduction circuit. Advantageously, however, the bit rate reduction circuit is a programmable compressor. The bit rate reduced video signal is outputted to a USB hub circuit 117. The USB hub circuit 117 has a serial port 118 that can output the video signal as a serial bitstream via cable 119. The cable 119, which is plugged into the connector 154 (externally to the computer housing 156), delivers the video signal to the serial port 152 of the hub circuit 150 in the south bridge 148.

The reduction of the bit rate by the bit rate reduction circuit 115 ensures that the video signal has a sufficiently low enough bandwidth to be received by the USB serial port 152. Table 1 summarizes the average bit rates produced according to several well known standards:

TABLE 1

| Standard | Bit Rate |
| --- | --- |
| H.261 | 128 Kbits/sec |
| H.263 | 20 Kbits/sec |
| MPEG-1 | 1.55 Mbits/sec |
| MPEG-2 | 4–80 Mbits/sec. |

For instance, as noted in Table 1, a fairly high quality interlaced video signal can be compressed to an average bit rate of 1.55 Mbits/sec using the MPEG-1 technique or 4–80 Mbits/sec using the MPEG-2 technique. However, H.261, H.262 and H.263 can compress a video signal to even 15–20 kbits/sec with adequate quality for interactive video communication. On the other hand, the bit rate reduction circuit 115 may be a less sophisticated circuit which merely reduces the resolution and/or frame rate of the video signal. In such a case, the reduction in bit rate may be less, e.g., a reduction to 4–8 Mbits/sec. If the bit rate is not sufficiently low enough to transfer the video data via a network, the processor 128 illustratively may be programmed with suitable software for compressing the bit rate reduced video according to the MPEG-1, MPEG-2, H.261, H.262, H.263, JPEG, motion JPEG, etc. compression standards. In such a case, however, a compressor preferably is provided in computer system 120 that is connected to the system bus 124.

As noted above, the USB 200 can be used to connect multiple peripherals in a tree topology. For instance, the peripherals such as the keyboard 144, mouse 146, modem 158, microphone 162, etc. can also be connected to the USB 200. In such a case, the data transfers to and from these additional peripherals are interspersed with each other and with the transfer of the video signal from the camera 110. Several constraints must be imposed to enable both "bursty" data transfers to and from these other peripherals and continuous video signal transfers. First, the camera 110 should not obtain so much of the bandwidth of the USB 200 so as to "starve," i.e., prevent the other peripherals from communicating. Second, real time video requires continuity. To ensure continuity, a decoder at the far or receive end of the video signal must always have video signal data available for decoding. Simply stated, to avoid perceptible discontinuities or gaps in the video signal, video signal data must be delivered in a timely fashion. On the other hand, the video signal takes a certain amount of time to decode and display on the far or receive end (e.g., frames must be displayed for a frame time). If too much video signal data is delivered at one time, a buffer overflow can occur at the receive end decoder. In order to accommodate the above constraints, the following guidelines are illustratively used:

(1) the USB 200 is operated at the full bit rate, (2) the USB 200 is operated in isochronous communication mode, and (3) an elaborate arbitration scheme is used to prevent peripheral communication starvation and to ensure continuity of the video signal.

Generally speaking, the second guideline can be ensured by the first guideline. The second guideline allows for orderly scheduling of peripheral and video signal data transfers in achieving the third guideline.

Note that the USB 200, in particular, the serial ports 118 and 154 of the hubs 150, 117, 168 support bidirectional transfer of signals. To that end, the serial port of each hub 150, 117, 168 has both transmit and receive circuitry. In addition to transferring video signals from the hub 117 to the hub 150, data may be transferred from the hub 150 to the hub 117 by interspersing the video signal and the data transfer signal. Such data transfers can be used to program/adjust the bit rate reduction circuit 115 (the ADC 113 and/or the imaging device 111) to vary the bit rate reduction. Programmable compressors 115 are available which include basic spatial and temporal compression sub-circuitry and processors, such as RGB to YUV converters, discrete cosine transformers, inverse discrete cosine transformers, quantizers, dequantizers, variable length encoders, video buffer verifiers, motion estimators, motion compensators, block matchers, loop filters, inter/intra decision circuits, etc. Illustratively, such programmable processors can be programmed to compress the video in compliance with a number of compression standards such as, H.261, H.262, H.263, MPEG-1, MPEG-2, JPEG, motion JPEG, etc. Furthermore, within any given standard, different parameters may be adjusted such as quantization step sizes, inter/intra decision thresholds, group of picture formats, bit rate, etc and different compression options, such as anthmetic coding, may be selected. Illustratively, the bit rate reduction circuit 115 can be programmed by means of a transfer of data and/or instructions via the USB 200. Even a simple resolution/frame rate reduction circuit 115 has programmable parameters such as resolution, number of frames per second, frame dropping rate, etc. For example, the bit rate reduction circuit 115, ADC 113, and/or imaging device 111 can be programmed to drop a certain fraction of frames or to change the frame interval, e.g., to change the frame sampling time from $\frac{1}{30}$th of a second to say $\frac{1}{6}$th of a second. The latter frame integration technique tends to produce a smoother lower frame rate video signal than the frame dropping technique. Illustratively, data may be transferred via the USB 200 to the bit rate reduction circuit 115 or imaging device 111 for varying the resolution, frame interval, frame dropping rate, etc.

Note that at least the bit-rate reduction circuit 115 contains registers and/or memory in which information indicating the bit rate variation capabilities, i.e., compression standards, adjustable compression parameters, selectable compression options, supported transfer bit rates, frame rates, resolutions, etc., may be stored. Such information may be prestored in a ROM or may be loaded into the bit rate reduction circuit 115 on power-up during an auto-configure procedure of driver software executed by the processor 128 for configuring the camera 110. The capability information can be downloaded via USB 200 to the processor 128 and/or transferred to a remote video conferencing system 100' in the course of negotiating video conferencing terminal capabilities (i.e., display resolution, communications rate and parameters, bit rate reduction capabilities, etc.) in setting up of a communication. For example, when a user at the near end, local video conferencing system 100 (camera 110 and computer system 120) initiates a communication with a far end, remote video conferencing system 100' (camera 110' and computer system 120'), the processor 128 at the near end, local video conferencing system 100 obtains the capability information stored in the registers or memory of the bit rate reduction circuit 115 of the camera 110. To that end, the processor 128 transfers an instruction requesting such information via cpu bus 122, north bridge 130, system bus 124, south bridge 148, hub 150, cable 119 and hub 117, to bit rate reduction circuit 115. In response, the bit rate reduction circuit 115 transfers such information to the processor 128 via hub 117, cable 119, hub 150, south bridge 148, system bus 124, north bridge 130 and cpu bus 122. The processor 128 may select a subset of bit rate reduction capabilities that can be accommodated by the modem 130 or Ethernet adapter 160 (whichever is used for the communication). The processor 128 also determines the picture restoration capabilities of (i.e., decoding techniques, parameters and options, and temporal and spatial interpolation capabilities supported by) the computer system 120. Information regarding the bit rate reduction and picture restoration capabilities at the near end, local video conferencing system 100 may be transferred to the far end, remote video conferencing system 100'. The far end, remote video conferencing system 100' also obtains the bit rate reduction and picture restoration capabilities of the camera 110 and monitor 138 thereat. The near end, local video conferencing system 100 (camera 110 and computer system 120) and the far end, remote video conferencing system 100' (camera 100' and computer system 120') then negotiate which bit rate reduction methodologies to use. In the course of the negotiation, the video conferencing system at each end of the communication can transfer its bit rate reduction and picture restoration capabilities to the other end in an effort to determine a bit rate reduction and a picture restoration methodology. When the negotiation is complete, the processor 128 downloads instructions and information to the camera 110 for varying the bit rate reduction using a methodology for which the far end, remote video conferencing system 100' can restore the pictures as per information received from the far end, remote video conferencing system 100' regarding its picture restoration capabilities. Likewise, the processor 128 obtains the correct information for restoring received pictures that are bit-rate reduced by the far end, remote video conferencing system 100' as per information received from the far end regarding its bit rate reduction capabilities.

Advantageously, a microphone 162 receives an audible sound and converts it to an audio signal in real time as the cameral 110 receives an image. An ADC 164 digitizes the audio signal and an audio compressor 166 compresses the audio signal. Illustratively, a USB hub circuit 168 receives the compressed audio signal and transmits it in bit serial form from serial port 170 to the hub 117, interspersed with the video signal outputted from the camera 110 and any other data signal transmitted on the USB 200.

The hub 150 receives the video (and illustratively the audio signal). The received signals may be transferred via south bridge 148, system bus 124, and north bridge 130 into one of the memories 132 or 134. From there, the video and/or audio signal may be processed by the processor 128, e.g., error protected using an error protection code, compressed, if necessary, etc. The video and/or audio signal may then be outputted (in multiplexed form) via north bridge 130, system bus 124, Ethernet adapter 160 and an ethernet network to the far end, remote video conferencing system 100' of similar architecture as the video conferencing system 100. Alternatively, or in addition, the video and/or audio signal can be outputted via north bridge 130, system bus 124, south bridge 148, I/O expansion bus 126, modem 158 and a public telephone network to the far end, remote video conferencing system 100'. In another embodiment, the video and/or audio signal received at the hub 150 is outputted directly to the Ethernet adapter 160 or modem 158, both of which can be connected to the USB 200.

A video and/or audio signal may be received from the far end, remote video conferencing system 100' at the near end, local video conferencing system 100 shown in FIG. 5. The video and/or audio signal may be received at the ethernet adapter 160 or at the modem 158. A video and/or audio signal received at the ethernet adapter 160 may be transferred via system bus 124 and north bridge 130 to main memory 132 or cache memory 134. Alternatively, if the video and audio signal are received at the modem 158, the video and audio signal are transferred via the I/O expansion bus 126, south bridge 148, system bus 124 and north bridge 130 to the memory 132 or 134. From there, the processor 128 may separate the video and audio signals for further processing such as error correction, decryption, and restoration (i.e., decompressing, spatial/temporal interpolation, etc.). Alternatively, a special purpose processor (not shown) may be connected to the system bus 124 for performing at least the video signal restoration. In yet another embodiment, a special processor for performing video restoration may be included with the graphics adapter 136 to which the non-restored video signal is directly transferred (i.e., from the modem 158 or Ethernet adapter 160). The restored video signal is transferred to the graphics adapter 136 (or is present thereat). The graphics adapter 136 outputs the restored video signal on the display monitor 138. In addition, the restored audio is also received via the graphics adapter 136 and outputted to a loudspeaker contained in the display monitor 138. Alternatively, an external loudspeaker can be connected to the USB 200. The audio signal can be restored by a number of devices, such as the processor 128. The restored audio signal is then outputted via the USB 200 to the loudspeaker.

The system 100 according to the present invention achieves the following advantages:

(1) Because the housing 156 need not be opened to install the camera 110, the user may install the camera 110 without voiding a manufacturer warranty on the computer system 120.

(2) Because the housing 156 need not be opened to install the camera 110, a novice user can easily install the camera 110 by simply plugging cable 119 into a standard connector 154. Using an auto-recognition process native to the USB standard, the camera 110 is automatically recognized and appropriate driver software for using the camera 110 can automatically be selected.

Figure 1:
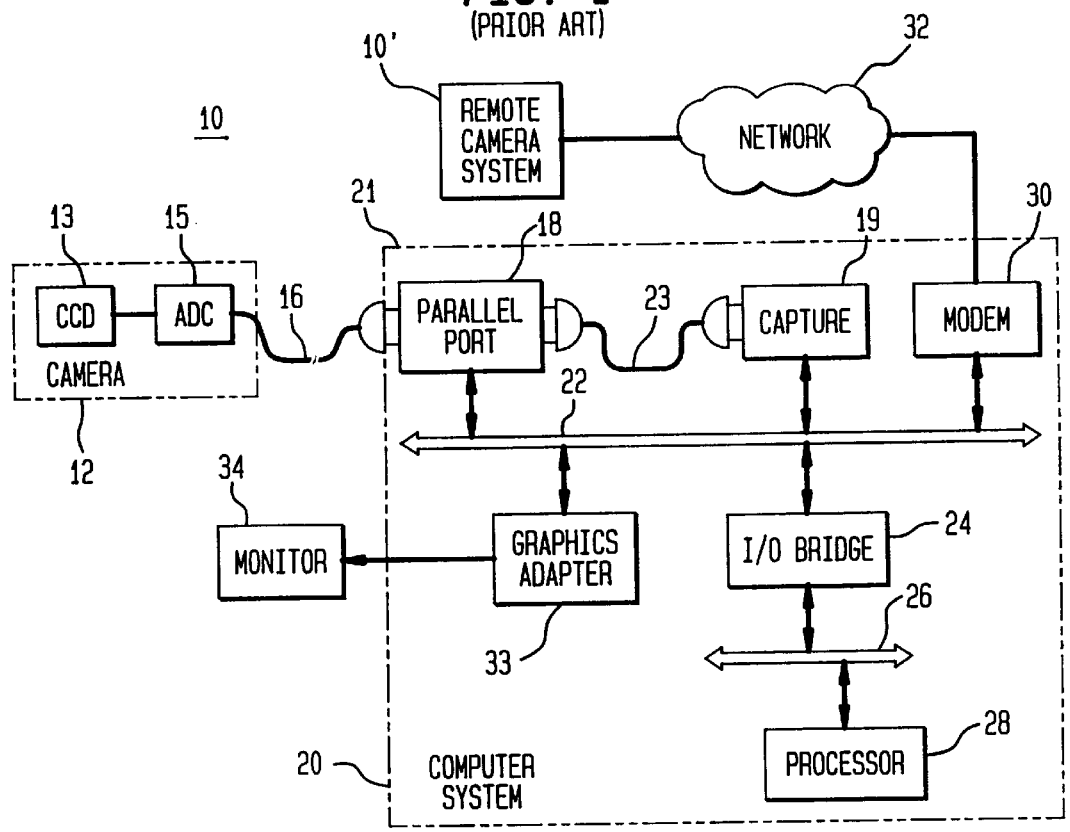
FIG. 1 shows a first conventional video conferencing system.
Figure 2:
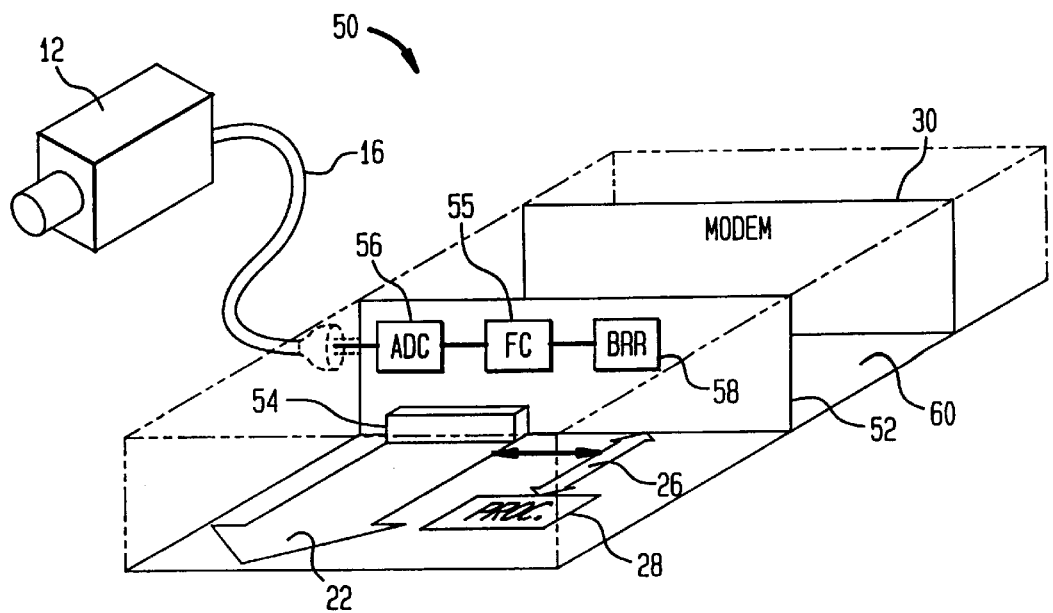
FIG. 2 shows a second conventional video conferencing system.
Figure 3:
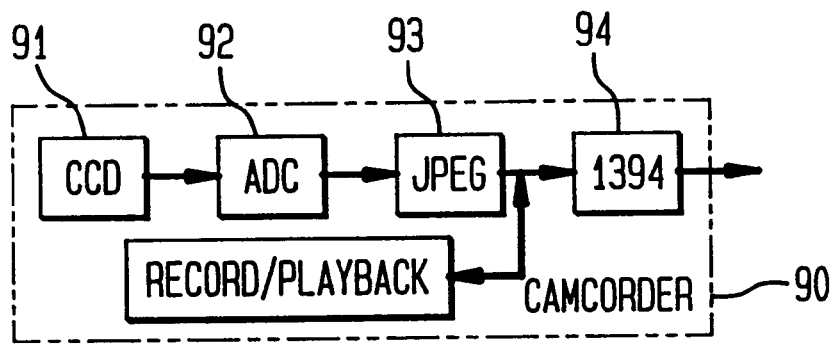
FIG. 3 shows a conventional camcorder.

(3) The cost of the system 100 is reduced. This is because no video capture board is needed to receive the video signal as is required in either the system of FIGS. 1 and 2.

(4) The camera 110 is connected to the computer by way of a standard connector 154. The camera is therefore cross-platform compatible.

(5) In addition to receiving a video signal from the camera 110, instructions and data can be transferred to the camera 110, e.g., for varying the resolution and/or compression, using the same connecting USB 200.

(6) The USB 200 connecting the camera 110 to the computer system 120 is shared by multiple devices. Thus, the video signal produced by the camera 110 may be received by any other peripherals connected to the USB 200 other than the computer system 120, such as a modem 158, ethernet adapter 160, etc.

(7) By providing bit rate reduction circuitry 115, the camera 110 is provided with registers and/or memory in which bit rate reduction capabilities of the camera 110 may be stored. Thus, the processor 128 can easily determine the capabilities of the video conferencing system 100 and transmit such capabilities to the far end, remote video conferencing system 100' during a negotiation process. As such, the camera 110 enables automatic setup during each communication session.

In another embodiment, the camera 110 and display monitor 138 can be combined into a single device. For instance, a display monitor 138 can be provided with a camera 110 installed within the display monitor housing above the display monitor screen. Illustratively, the hub 117 of the camera is connected to a downstream serial port of the display monitor hub. The display monitor hub is then connected to the hub 150. Such an arrangement facilitates video communication. In particular, a user facing the display screen of the display monitor at the near end, local video conferencing 100 of a communication can view a moving picture image captured by the far end, remote video conferencing system 100' and transmitted via a network for decoding and display at the near end, local video conferencing system 100. Simultaneously, the user's own image is captured, digitized and encoded at the near end, local video conferencing system 100 for transmission to the far end, remote video conferencing system 100' where it is decoded and displayed at the far end, remote video conferencing system 100'. In short, "face-to-face" communication is facilitated between a user at a near end, local video conferencing system 100 and a user at the far end, remote video conferencing system 100'.

Figure 6:
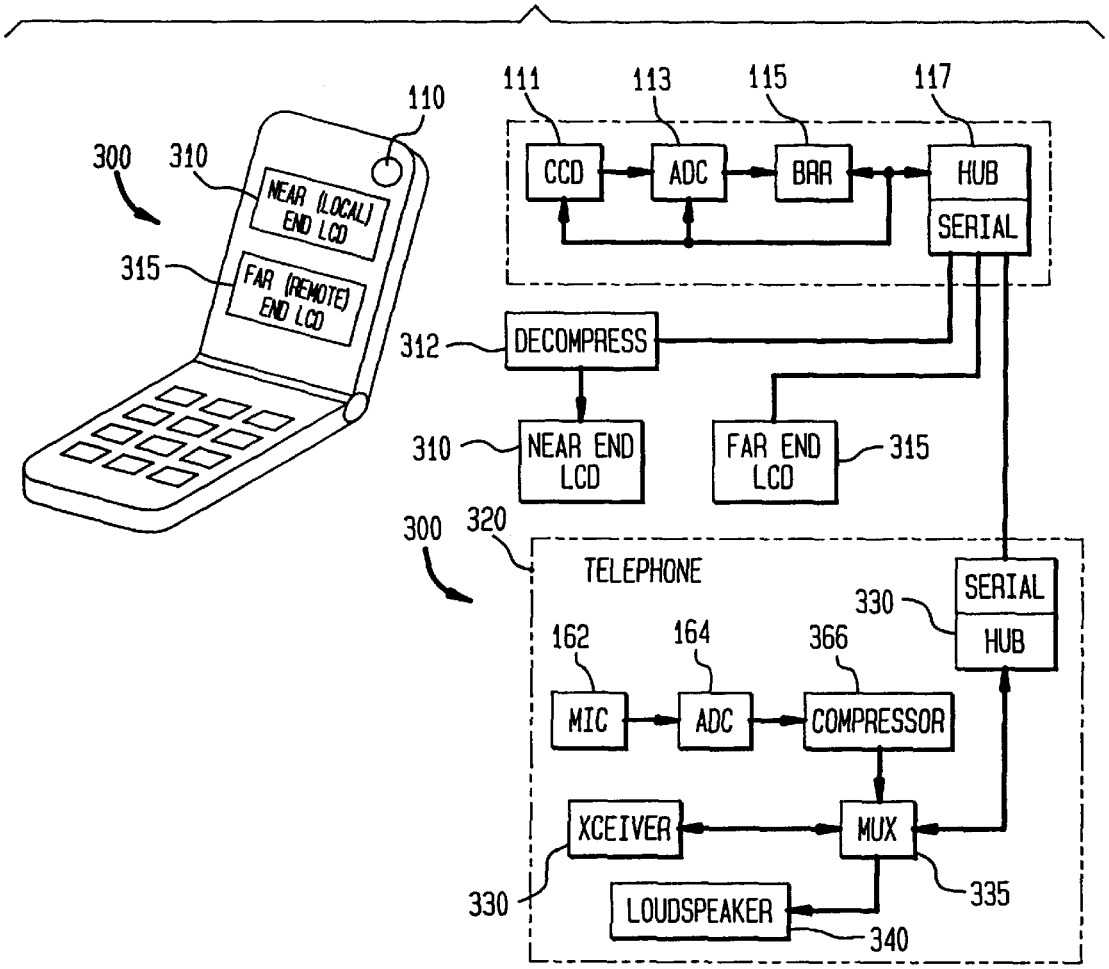
FIG. 6 shows a cellular telephone according to an embodiment of the present invention.

Such a display monitor feature can be incorporated into a common cellular phone. Many cellular telephones have data inputs that enable the cellular phone to function as a modem. Such a data input may potentially be replaced with a USB interface. FIG. 6 depicts a cellular phone 300 according to the present invention equipped with one or more liquid crystal display monitors (LCDs) 310, 315 and camera 110. LCD monitor 310 displays a near end, local image captured by imaging device 111. LCD monitor 315 displays a far end remote image captured by a far end, remote camera (not shown). The LCD monitors 310 and 315 are connected to downstream serial ports of the hub 117 of the camera 110. The hub 117 is also connected to the hub 330 of a telephone circuit 320. Illustratively, in the example shown in FIG. 6, the bit rate reduction circuit 115 is an H.263 compliant compressor. Illustratively, the LCD monitor 310 is also provided with a decompressor circuit 312, such as the VCP™ (A like decompressor may be provided for LCD 315). Note also that an additional serial port can be provided in either the hub 117 or the hub 330 for connection to a hub of a computer (e.g., the hub 150 of the computer 120 of FIG. 5).

Illustratively, in the telephone 320, near end, local audio is received at microphone 162 which outputs an analog audio signal to ADC 164. ADC 164 outputs a digital audio signal to compressor 366. The compressor 366 can operate in at least two modes. When no video is simultaneously transmitted, the compressor 366 uses an ADPCM compression technique which produces a 16 Kbit/sec audio signal. When video is simultaneously transmitted, compressor 366 uses a different technique such as CCITT's G.723, which produces a 5.3 or 6.3 Kbit/sec bit rate compressed audio signal.

The compressed audio signal is outputted to a multiplexer/demultiplexer 335 which also receives the compressed video signal outputted from hub 330. The multiplexer/demultiplexer 335 selectively multiplexes the compressed audio and video signals and outputs the multiplexed signal to transceiver 330. Transceiver 330 transmits the multiplexed signal via a cellular network to the far end, remote video conferencing system. The transceiver 330 also receives a multiplexed signal from the far end, remote video conferencing system via the cellular network. The received signal is demultiplexed by multiplexer/demultiplexer 335 into its constituent compressed audio and video signals. The audio signal is decompressed (by an audio decompressor not shown) and outputted via loudspeaker 340. The compressed video is outputted via hub 330 and hub 117 for decompression and display on LCD 315.

Figure 7:
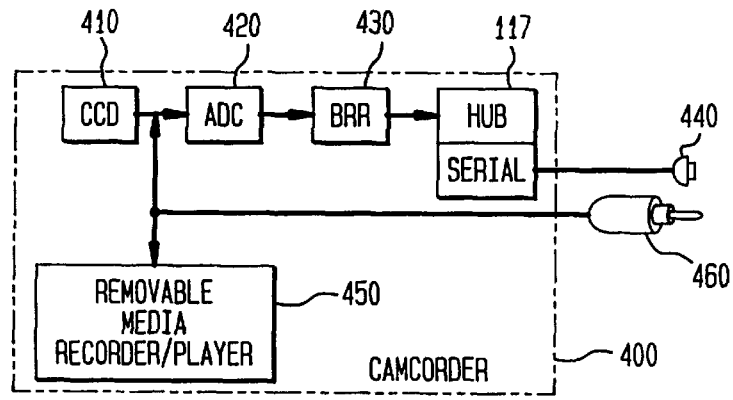
FIG. 7 shows a camcorder according to an embodiment of the present invention.

FIG. 7 shows an embodiment of the invention for a camcorder 400. Illustratively, the camcorder 400 is equipped with an imaging device 410. Such a signal may be recorded as an analog signal on a removable storage medium using a removable media recorder/player 450. The video signal produced by imaging device 410 or removable media recorder/player 450 may be outputted via jack 460 and/or outputted to ADC 420 where it is digitized. A compressor or other bit rate reduction circuit 430 is also provided for reducing the bit rate of the digital video signal. A USB hub circuit 117 is connected to the bit rate reduction circuit 430. Thus, in addition to the usual camcorder output 460, which may be a composite analog video signal, a USB compliant connector 440 is provided which outputs a serial bitstream containing the video signal as produced by the USB hub circuit 117. The USB hub circuit 117 is bidirectional and can receive information and instructions as well as transmit video signals.

In short, a camera is disclosed including a bit-rate reduction circuit connected to the CCD imaging device. Since the bit rate reduction circuitry is external to the computer system housing, the video signal can be inputted via a standard serial port having a connector external to the computer system housing.

Finally, the above-discussion is intended to be merely illustrative of the invention. Numerous alternative embodiments may be devised by those having ordinary skill in the art without departing from the spirit and scope of the following claims.

The claimed invention is:

1. A video conferencing system comprising:

a first housing, a bus located inside said first housing, a processor located inside said first housing and connected to said bus, a first interface circuit located inside said first housing and connected to said bus, said first interface circuit comprising a first hub and a serial port for receiving digital signals, that are transmitted according to a predefined communications protocol, originating outside said first housing, a communications medium located outside said first housing and connected to said first interface circuit externally to said first housing, for communicating a serial bitstream, a second housing external to said first housing, an imaging device located inside said second housing that converts moving pictures to a video signal, a bit-rate reduction circuit inside said second housing and connected to said imaging device which reduces a bit rate of said video signal to a selected one of a plurality of multiple bit rates, so as to produce a bit-rate reduced video signal having a lower bandwidth than said video signal prior to bit rate reduction, such that the selected bit-rate reduced video signal being adaptable to and transferable over one of a plurality of different types of networks, each different type of network having different bit rates and different communications protocols from one another, and a second interface circuit located inside said second housing and having a second hub connected between said bit rate reduction circuit and said communications mediun, for receiving said bit rate reduced video signal and outputting said bit rate reduced video signal as a serial bitstream on said communications medium in accordance with said predefined communications protocol wherein said processor transfers at least one instruction packet via said bus, said first hub, said communication medium and said second hub to said bit rate reduction circuit containing an instruction indicating bit rate information of a selected one of said plurality of different networks, from one of a plurality of predetermined adjustable bit rates representing said plurality of different types of networks, independent of any bit rate information feedback from the selected network.

2. The system of claim 1 further comprising:

a modem connected to said bus, for receiving said bit rate reduced video signal and communicating said bit rate reduced video signal to a second modem via a communications network.

3. The system of claim 2 wherein said modem receives a remote bit rate reduced video signal from said second modem and wherein said processor restores said remote bit rate reduced video signal, said system further comprising:

a monitor on which said processor displays said restored remote video signal.

4. The system of claim 1 wherein said first interface comprises transmit circuitry for downloading at least one instruction packet via said communications medium and said second interface for selecting one of a plurality of said different bit rates by said bit rate reduction circuitry.

5. The system of claim 1 wherein said bit rate reduction circuit comprises a memory for storing information regarding bit rate reduction capabilities of said bit rate reduction circuit, wherein said processor transmits an instruction packet that requests retrieval of said bit rate reduction capabilities to said bit rate reduction circuit via said first interface, said communications medium and said second interface, and wherein said bit rate reduction circuit and said second interface respond to said request instruction packet by transferring said information via said second interface and said communication medium to said first interface.

6. The system of claim 5 wherein picture restoration capability information is received from a far end, remote system at said processor, wherein said processor transfers an instruction via said first interface, said communications medium and said second interface to said bit rate reduction circuit that causes said bit rate reduction circuit to reduce a bit rate of said video signal in a particular fashion to produce a bit rate reduced video signal that said far end, remote system can restore as specified in said received picture restoration capability information.

7. The system of claim 1 wherein said serial port of said first interface comprises a connector located external to said first housing and enabling connection to said communications medium totally externally to said first housing.

8. The system of claim 1 wherein said bit rate reduction circuitry comprises a video compressor.

9. The system of claim 1 wherein said bit rate reduction circuitry comprises video resolution/frame rate reduction circuitry.

10. The system of claim 1 comprising at least one peripheral having an additional interface connected to said communication medium, said communication medium carrying data communication of said at least one peripheral interspersed with said compressed video signal.

11. A video conferencing and processing terminal comprising:
 (a) a computer housing containing:
  (a1) an internal bus,
  (a2) a general purpose processor connected to said internal bus, instruction, data and video information being transferable to and from said processor via said bus, said processor for time shared performance of data processing and processing associated with conducting a video conference,
  (a3) a bridge connected to said internal bus, instruction, data, and video information being transferable to and from said bridge via said internal bus, said bridge comprising a hub, data, instruction and video information being transferable to and from said hub of said bridge in a bidirectional serial bitstream according to a first predefined communications protocol on a first external communications network,
  (a4) at least one external communications interface for bidirectionally transferring at least video information and instructions between said general purpose processor and a second communications network external to said computer housing, said second communications network being of a different type, utilizing a different communications protocol, as said first external communications network,
 (b) a communication medium of said first external communications network connected to said hub and located external to said computer housing,
 (c) a camera housing external to said computer housing containing:
  (c1) an imaging device for converting moving picture images to a video signal,
  (c2) a programmable bit rate reduction circuit connected to said imaging device for reducing a bit rate of said video signal, said programmable bit rate reduction circuit for responding to one or more instructions originating externally to said camera housing by varying said reduction of bit rate of said video signal, and
  (c3) a second hub connected between said bit rate reduction circuit and said communications medium, for bidirectional transfer of serial bitstreams across said communication medium, and for multiplexing said bit rate reduced video signal and instruction packets into said serial bitstreams so as to transfer said bit rate reduced video signal from said bit rate reduction circuit to said first hub and to bidirectionally transfer instruction packets between said bit rate reduction circuit and said first hub, said second hub also for demultiplexing from said bitstreams transferred on said communication medium only packets destined to circuitry within said camera housing and refraining from demultiplexing each other packet destined to circuitry external to said camera housing communicated in said bitstreams,
 wherein said first hub, said second hub and said communication medium define at least part of said first external communication network, at least one of said first and second hubs comprising an additional connector for connecting a second communication medium and a third hub to form a tree topology communication network with said first hub serving as said root hub, said first and second hub responding to instructions according to said first communication protocol for adjusting a generation of, and multiplexing of data onto, bidirectionally transmitted serial bitstreams on each communication medium connected thereto to enable data transfers to originate from, or terminate at, said camera housing, said computer housing, and at least one other device connected to said first external communication network via said third hub,
 wherein said processor transfers at least one instruction packet via said internal bus, said first hub, said communication medium and said second hub to said bit rate reduction circuit containing an instruction for adjusting a bit rate of said bit rate reduced video signal, according to a capacity of said first external communication network for carrying said bit rate reduced video signal, as well as information from at least one other device located outside said camera housing and said computer housing but connected to said first external communications network via said third hub, and at least one of (1) a capacity of said second external communications networks for carrying said bit rate reduced video signal, (2) a restoration processing capability of another video conferencing terminal, with which said video conferencing and data processing terminal communicates via said second external communications network, and (3) a display resolution of said second video conferencing terminal.

12. The system of claim 11, wherein at least one of said at least one other device connected to said first external communication network via said third hub being a second camera housing.

* * * * *

UNITED STATES PATENT AND TRADEMARK OFFICE
CERTIFICATE OF CORRECTION

PATENT NO. : 5,969,750
DATED : October 19, 1999
INVENTOR(S) : Peter H. Hsieh, et. al.

It is certified that error appears in the above-identified patent and that said Letters Patent is hereby corrected as shown below:

The title page, item [73], the Assignee's name should read:

--Winbond Electronics Corporation--.

Signed and Sealed this

Fourteenth Day of November, 2000

*Attest:*

Q. TODD DICKINSON

*Attesting Officer*     *Director of Patents and Trademarks*